Patented Oct. 18, 1932

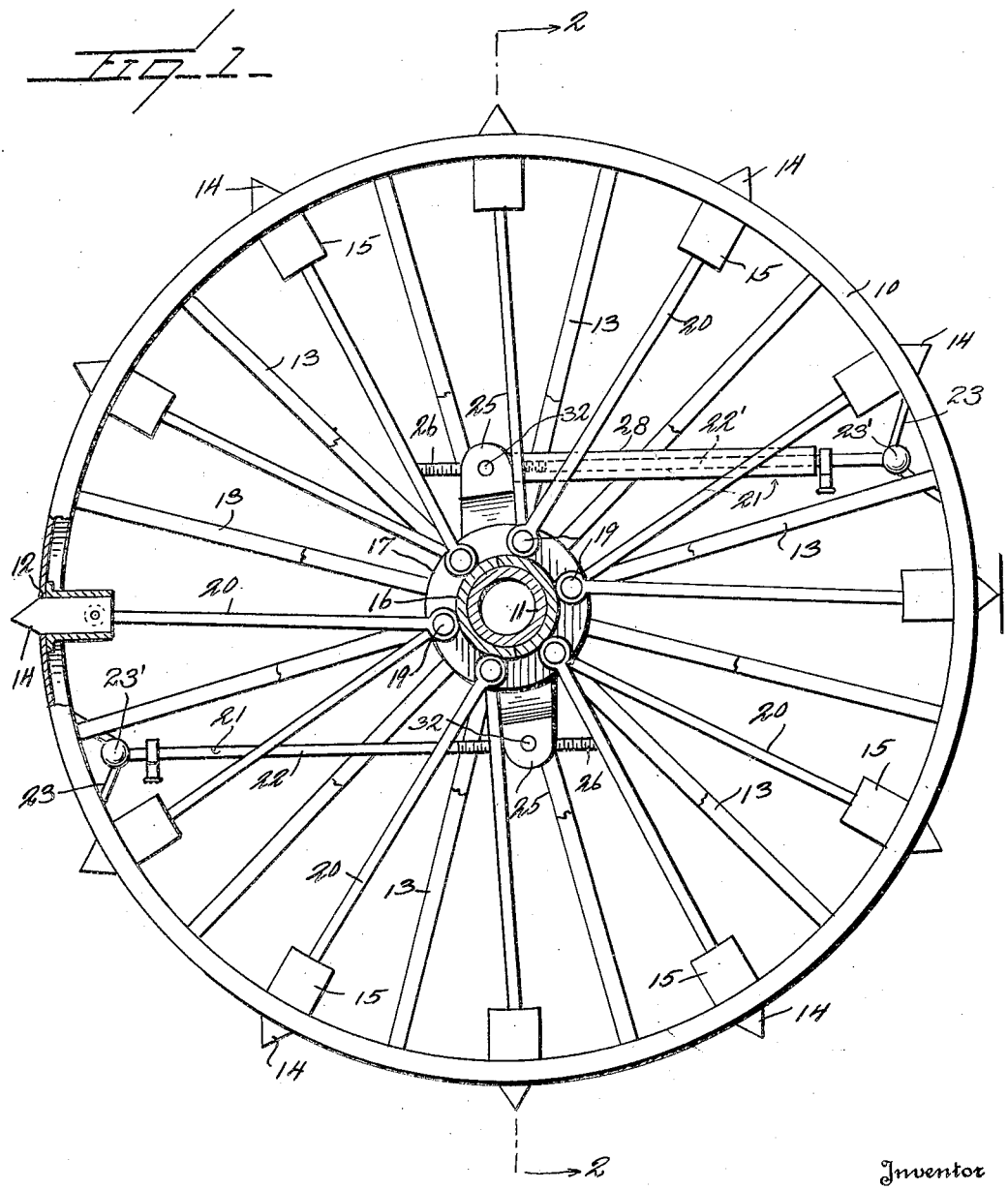

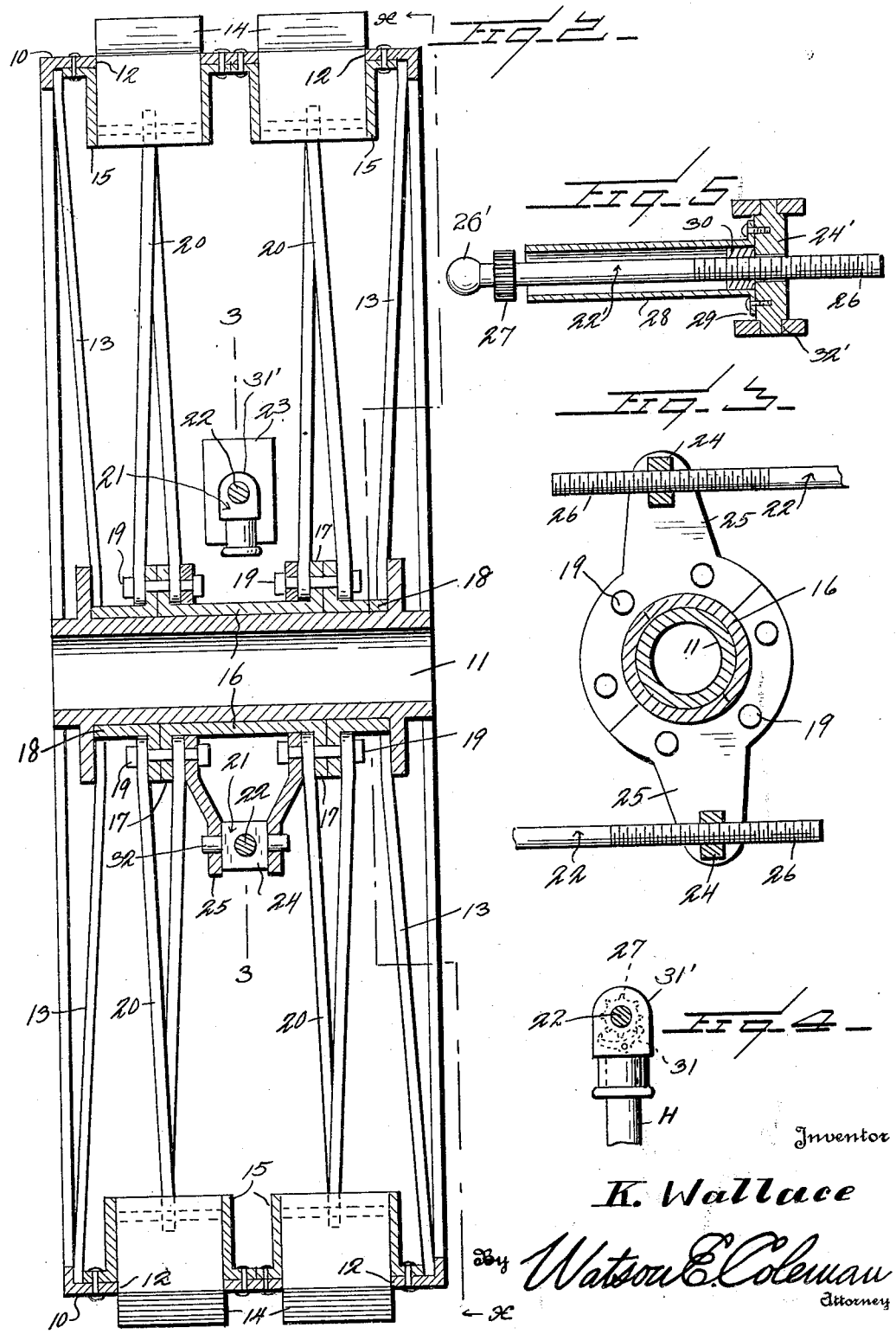

1,883,836

UNITED STATES PATENT OFFICE

KIERAN WALLACE, OF CLAY TOWNSHIP, JONES COUNTY, IOWA

TRACTOR WHEEL LUG

Application filed May 26, 1931. Serial No. 540,114.

This invention relates to tractor lugs, and more particularly to retractile lugs.

An object of this invention is to provide a plurality of lugs which are adapted to be mounted in a tractor wheel which may be readily moved into operative position, the lugs being slidably mounted in the rim of the wheel.

Another object of this invention is to provide in a device of this kind means for bracing the lugs so that the operating means will not be under undue strain when the lugs are extended through the rim.

A further object of this invention is to provide novel operating means for moving the lugs through the rim, the operating means being disposed between the spokes of the tractor wheel and engaging about the hub of the wheel.

The above and various other objects and advantages of this invention will in part be described in and in part be understood from the following detailed description of the present preferred embodiment, the same being illustrated in the accompanying drawings, wherein:—

Figure 1 is a detail side elevation partly broken away of a device constructed according to the preferred embodiment of this in-
vention mounted on a tractor wheel, the sectional portion of the figure being taken on the line X—X of Figure 2;

Figure 2 is a sectional view taken substantially through the center of the device and on the line 2—2 of Figure 1, but showing two jack members 22 employed.

Figure 3 is a sectional view taken on the line 3—3 of Figure 2;

Figure 4 is an enlarged fragmentary detail view partly in section of the operating means for the jacks, and Figure 5 is a longitudinal section partly in detail of a modified form of jack construction.

Referring to the drawings wherein like numerals of reference designate corresponding parts throughout the several views, the numeral 10 designates the rim of a tractor wheel which is provided with a hub 11 and a plurality of spokes 13 connecting the hub 11 and the rim or tread 10. The rim 10 is provided with a plurality of circumferentially spaced openings 12 therethrough, which are arranged in pairs adjacent the sides of the rim 10, for loosely receiving tractor lugs 14 which extend through the openings 12. Flanged guide members 15 are secured to the inner surface of the rim 10 about the openings 12 and each lug 14 is adapted to have relatively sliding movement within a guide 15. A sleeve member, generally designated as 16, is rotatably mounted on the periphery of the hub 11, this tubular member 16 being provided at the opposite ends thereof with upstanding flanges 17 and an angular member 18 is secured to each flange 17 and extends outwardly of the tubular member 16, the outer end of the angle member 18 being adapted to engage against the spokes 13 so as to center the tubular member 16 between the spokes 13 and about the hub 11. This tubular member 16 is preferably of split construction so as to permit the mounting of the member about the hub 11 without removing the spokes 13. In like manner, the angle members 18, which are of segmental configuration, are adapted to be mounted between the spokes 13 without removing the spokes from the hub or the rim.

The angle members 18 have one leg thereof disposed in substantially vertical position and engaging against the outer face of the flange 17 and are secured thereto by means of bolts 19 or the like. A connecting link 20 is secured at one end to the inner end of the lug 14 and the opposite or inner end of the link 20 is pivotally secured to a bolt 19 which extends through a flange 17 and into the channel between the two flanges. These connecting links 20 are preferably secured to the flanges 17 of the tubular member 16 in pairs, one on each end of the bolt 19 on opposite sides of the flange formed by the flanges 17 and the angle members 18, so that when the tubular member 16 is rotated about the hub 11, the links 20 will not contact with each other or interfere with their movement.

In order to move the lugs 14 either inwardly or outwardly of the rim 10, I have provided a pair of operating members, generally designated as 21, which comprise a pair of jack members 22 which are swingably secured at the outer ends thereof to inwardly extending lugs or plates 23 mounted on the inner surface of the rim 10, and the opposite ends of the jack members 22 engage in rockable plates 24 which are secured to inwardly extending supporting members 25 carried by the tubular member 16. The jack members 22 comprise a threaded shaft 26 having a round head 26' which is swivelly mounted in a socket 23' formed in the lug or plate member 23 and provided with a toothed ratchet 27 adjacent the outer end thereof, the inner end of the shaft 26 being threadedly disposed through the plate member 24 in cases where a relatively light tractor is used.

Where a relatively heavy tractor is used, the threaded shaft 26 is slidably mounted in the swingable plate member 24' and an elongated sleeve 28 of substantially rectangular or square cross sectional configuration which is provided with flanges 29 is secured to the plate 24', and a nut 30 is slidably disposed in the sleeve 28 and threadably engages the shaft 26. A reversible dog 31 carried by a housing 31' engages the ratchet 27 and is adapted to hold the shaft 26 in adjusted position. A handle H is adapted to removably engage the housing 31'. While I have shown two jack members 22 for moving the lugs 14 into operative or inoperative position, I do not wish to be limited to this construction as, if desired, only one jack may be used. The plate 24 is provided at each end thereof with pintles 32 which rockably engage the supporting members 25 so as to permit relative rocking movement of the plates 24 and 24' as the jack 22 is operated.

When the lugs 14 are in operative or extended position, the link members 20 are mounted in V-shaped position, the pressure of one link 20 counteracting the pressure of the other link 20. The inner ends of the links 20 are preferably rounded and engage against the periphery of the hub member 16 so that the bolts 19 will not bear the pressure exerted by the lugs 14 on the links 20. The connection between the links 20 and the bolts 19 is preferably a relatively loose connection so that the inner ends of the links 20 will contact with the periphery of the hub member 16. Through the use of the jack member 22', when it is desired to extend the lugs 14, it is only necessary to operate one of the jacks 22 as the nut 30 will slide inwardly of the tubular guide member 28, and the shaft 26 will slide through the rockable plate 24'.

While, in the drawings, I have shown two jack members 22 of similar construction, which are mounted within a tractor wheel, preferably the tractor wheel is provided with one jack member 22 and one jack member 22', the jack member 22' being used for extending the tractor lugs through the rim of the wheel only when the lugs appear to bind, whereupon the jack member 22' is used in conjunction with the jack member 22. This jack member 22' is constructed of the slip type so that the nut 30 will slip within the housing 28 in the event the plate 24' is moved away from the nut 30 through the action of the jack member 22.

In the operation of this device, where the tractor is moving over relatively hard ground or concrete, the lugs 14 may be retracted so that the outer ends thereof will be substantially flush with the peripheral portion of the rim 10, this being accomplished by rotating the screw 26 in one direction, so as to rock the sleeve 16, which will move the links 20 so that they will be in tangential relation to the sleeve 16. When it is desired to move the lugs 14 into operative or extended position, the jack members may be operated in the opposite direction so as to rotate the hub member 16 on the wheel hub 11, this hub 16 being rotated until the links 20 are substantially radially inclined with respect to the axis of the tractor wheel. The dog member 31 will hold the jack member in set position so that it will not permit the inward movement of the lugs 14 as the wheel is moving over the ground.

It is, of course, understood that various changes and modifications may be made in the details of construction and design of the above specifically described embodiment of this invention without departing from the spirit thereof, such changes and modifications being restricted only by the scope of the following claim.

I claim:—

In a tractor wheel, a plurality of lug members, guide means carried by the wheel rim for said lug members, a rotatable member mounted on the wheel hub, links connecting the rotatable member with the lug members, and lug operating means engaging the wheel and the rotatable member, said operating means including a screw, a nut on the screw, means for rotating the screw, a rock member engaging the rotatable member, and a guide member carried by the rock member and engaging the nut to hold the nut against rotation while permitting sliding thereof relative to the rock member in one direction.

In testimony whereof I hereunto affix my signature.

KIERAN WALLACE.